(12) United States Patent
Itoh

(10) Patent No.: US 6,500,900 B1
(45) Date of Patent: Dec. 31, 2002

(54) OLEFINIC THERMOPLASTIC ELASTOMER, COMPOSITION AND USE THEREOF

(75) Inventor: Yuichi Itoh, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 5 days.

(21) Appl. No.: 09/695,295

(22) Filed: Oct. 25, 2000

(30) Foreign Application Priority Data

Oct. 25, 1999 (JP) .......................................... 11-301908

(51) Int. Cl.$^7$ .......................... C08L 23/26; B62D 29/04
(52) U.S. Cl. ...................... 525/216; 525/232; 525/236; 525/237; 525/240
(58) Field of Search .............................. 525/216, 232, 525/236, 237, 240

(56) References Cited

U.S. PATENT DOCUMENTS

| | | | |
|---|---|---|---|
| 5,362,572 A | * 11/1994 | Hamada et al. | 428/497 |
| 5,948,867 A | * 9/1999 | Abhau | 525/194 |
| 6,288,156 B1 | * 9/2001 | Hausmann | 524/427 |

FOREIGN PATENT DOCUMENTS

| | | |
|---|---|---|
| EP | 0844279 A1 | 5/1998 |
| EP | 0872517 A1 | 10/1998 |
| EP | 0947541 A1 | 10/1999 |
| WO | 9911705 | 3/1999 |

OTHER PUBLICATIONS

Database WPI, XP–002159416; JP 08 199010, Aug. 6, 1996.

* cited by examiner

*Primary Examiner*—Nathan M. Nutter
(74) *Attorney, Agent, or Firm*—Birch, Stewart, Kolasch & Birch, LLP (57) ABSTRACT

An olefinic thermoplastic elastomer capable of producing a sheet applicable for preparing a covering skin sheet for interior furnishings in automobile superior in the formability, heat resistance, mechnical properties, tensile characteristics, strain restorability and repulsive elasticity together with superior grain retention performance upon a male vacuum forming of the sheet, the said olefinic thermoplastic elastomer comprising an olefinic resin and an olefinic copolymer rubber and having a characteristic feature that it satisfies, when a grained sheet made of the said elatomer is subjected to a male vacuum forming at least at a point of sheet temperature within the range of 130–150° C., the condition that the grain retention rate expressed by the proportion of the grain depth of the sheet retained after the male vacuum forming relative to the grain depth before the male vacuum forming represented by percent meets the relation defind by the following equation (1)

$$\% \text{ retention of grain} \geq 100 - 2.0 \times (T - 120) \quad (1)$$

in which T represents the sheet temperature upon the male vacuum forming.

13 Claims, 2 Drawing Sheets

OLEFINIC THERMOPLASTIC ELASTOMER, COMPOSITION AND USE THEREOF

FIELD OF THE TECHNIQUE

The present invention relates to an olefinic thermoplastic elastomer, a composition, a sheet made of either one of them, a laminated product and covering skin sheets for interior furnishings of automobile.

BACKGROUND OF THE TECHNIQUE

Heretofore, coverage skin sheets for internal furnishings, such as instrument panel, door trim and so on, were made principally of soft vinyl chloride resin. In recent years, however, it has become to use an olefinic thermoplastic elastomer for it, in view of the common demand for light-weight articles. For shaping the covering skin sheet for internal furnishings made of an olefinic thermoplastic elastomer so as to conform it to the furnishing, such as instrument panel or door trim, a vacuum forming, above all, male vacuum forming has now been in practical use. The male vacuum forming is carried out using a non-grained forming mold having perforations for evacuating the interface between the mold surface and the covering skin sheet inside face by placing the grained (namely, grains are formed on the covering skin outer face beforehand by embossing) covering skin sheet on the mold with its grained outer face being exposed to the exterior and pressing the skin sheet onto the mold face by evacuating the space beneath the skin sheet. Therefore, the patterns on the grained outer face of the covering skin sheet may be apt to undergo deformation. In particular, a covering skin sheet made of an olefinic thermoplastic elastomer may suffer from such deformation of the pattern upon a vacuum forming, especially upon the male vacuum forming, more easily as compared with that made of soft vinyl chloride resin, resulting in an inferior ability for retaining the grains, so that it has been requested to obviate this disadvantage.

An olefinic thermoplastic elastomer exhibiting an improved ability for retaining the grains has been disclosed in Japanese Patent Kokai Hei 6-71751 A, which is obtained by subjecting a mixture composed of an olefinic copolymer rubber having a Mooney viscosity at 100° C. of 80–350, an oil-extensible olefinic copolymer rubber and an olefinic polymer to a partial cross linking.

This olefinic thermoplastic elastomer exhibits still an insufficient ability for retaining the grains, so that a further improvement is expected.

SUMMARY OF THE INVENTION

An object of the present invention is to solve the problems concomitant to the prior art mentioned above and to provide an olefinic thermoplastic elastomer as well as a composition comprising such olefinic thermoplastic elastomer, which are superior in the formability, heat resistance, mechanical properties, tensile characteristics, strain restorability and repulsive elasticity, together with superior ability for retaining grains when a grained sheet made therefrom is processed by vacuum forming, in particular by male vacuum forming.

Another object of the present invention is to provide a sheet, a laminated product and a covering skin sheet for interior furnishings in automobile made of the above olefinic thermoplastic elastomer or the elastomeric composition, which are superior in the ability for retaining the grains upon male vacuum forming thereof.

The present invention resides in the following olefinic thermoplastic elastomer, elastomeric composition and applications:

(1) An olefinic thermoplastic elastomer comprising an olefinic resin and an olefinic copolymer rubber and having a characteristic feature that it satisfies, when a grained sheet made of the said elatomer is subjected to a male vacuum forming at least at a point of sheet temperature within the range of 130–150° C., the condition that the grain retention rate expressed by the proportion of the grain depth of the sheet retained after the male vacuum forming relative to the grain depth before the male vacuum forming represented by percent meets the relation defind by the following equation (1)

$$\% \text{ retention of grain} \geq 100 - 2.0 \times (T - 120) \qquad (1)$$

in which T represents the sheet temperature upon the male vacuum forming.

(2) An olefinic thermoplastic elastomer obtained by subjecting a rubber composition comprising (A) 10–60%, based on the total weight of the composition, of a propylene resin having a melt flow rate (according to ASTM D 1238-65T, determined at 230° C. under a load of 2.16 kg) in the range from 0.1 to 3 g/10 min., (B) 37–87%, based on the total weight of the composition, of an ethylenic copolymer rubber made from ethylene, an $\alpha$-olefin having 3–20 carbon atoms and an optionally incorporated non-conjugated polyene and (C) 3–30%, based on the total weight of the composition, of a polyethylene resin to a dynamic heat treatment in the presence of a cross linking agent.

(3) An olefinic thermoplastic elastomer, obtained by subjecting a rubber composition comprising (A) 10–60%, based on the total weight of the composition, of a propylene resin having a melt flow rate (according to ASTM D 1238-65T, determined at 230° C. under a load of 2.16 kg) in the range from 0.1 to 3 g/10 min., (B) 37–87%, based on the total weight of the composition, of an ethylenic copolymer rubber made from ethylene, an $\alpha$-olefin having 3–20 carbon atoms and an optionally incorporated non-conjugated polyene and (C) 3–30%, based on the total weight of the composition, of a polyethylene resin to a dynamic heat treatment in the presence of a cross linking agent, wherein the said elastomer has a characteristic feature that it satisfies, when a grained sheet made of the said elatomer is subjected to a male vacuum forming at least at a point of sheet temperature within the range of 130–150° C., the condition that the grain retention rate expressed by the proportion of the grain depth of the sheet retained after the male vacuum forming relative to the grain depth before the male vacuum forming represented by percent meets the relation defind by the following equation (1)

$$\% \text{ retention of grain} \geq 100 - 2.0 \times (T - 120) \qquad (1)$$

in which T represents the sheet temperature upon the male vacuum forming.

(4) The olefinic thermoplastic elastomer as defined in the above (2) or (3), wherein the polyethylene resin (C) has a density in the range from 0.880 to 0.940 g/cm³.

(5) The olefinic thermoplastic elastomer as defined in any one of the above (2) to (4), comprising further a softener (D) in a proportion in the range from 10 to 200 parts by weight per 100 parts by weight of the ethylenic copolymer resin (B).

(6) The olefinic thermoplastic elastomer as defined in any one of the above (1) to (5), wherein the gel content thereof is in the range from above 20 to below 97%, based on the weight of the olefinic thermoplastic elasomer.

(7) The olefinic thermoplastic elastomer as defined in any one of the above (1) to (6), to be used as the material of coverage skin sheet for interior furnishings of automobile.

(8) An olefinic thermoplastic elastomeric composition, comprising the olefinic thermoplastic elastomer as defined in any one of the above (1) to (7) and a crystalline polyolefin resin (E), wherein the proportion of the crystalline polyolefin resin (E) is in the range from 20 to 200 parts by weight per 100 parts by weight of the olefinic thermoplastic elastomer.

(9) The olefinic thermoplastic elastomeric composition as defined in the above (8), to be used as the material of coverage skin sheets for interior furnishings of automobile.

(10) A sheet made of the olefinic thermoplastic elastomer as defined in any one of the above (1) to (7) or of the olefinic thermoplastic elastomeric composition as defined in the above (8) or (9).

(11) A grained sheet made of the olefinic thermoplastic elastomer as defined in any one of the above (1) to (7) or of the olefinic thermoplastic elastomeric composition as defined in the above (8) or (9).

(12) A sheet comprising
a substrate made of the sheet as defined in the above (10) or (11) and, coated thereon,
a top coat made of a material selected from the group consisting of polyurethane resin, saturated polyester resin, acrylate resin, polyvinyl chloride resin and isocyanate resin.

(13) A laminated product comprising
an external layer of the sheet as defined in any one of the above (10) to (12) and
substrate layer made of a foamed polyolefin.

(14) Covering skin sheets for interior furnishings in automobile, comprised of the olefinic thermoplastic elastomer as defined in any one of the above (1) to (7), of the olefinic thermoplastic elastomeric composition as defined in the above (8) or (9), of the sheet as defined in any one of the above (10) to (12) or of the laminated product as defined in the above (13).

DETAILED DESCRIPTION OF THE DISCLOSURE

In the context of this specification, it is contemplate to express by "the male vacuum forming" a technique for processing a grained sheet or a grained covering skin sheet for interior furnishings in automobile using a non-grained mold, such as metal mold, by fitting the grained sheet tightly onto the mold with the grained outer face of the sheet outwards by vacuum aspiration, in order to conform the sheet to the outer contour of the mold. Namely, the grains are on the side not fitted to the mold. The mold to be used for such a vacuum forming may either be a male mold or a female mold.

Figure 1A:
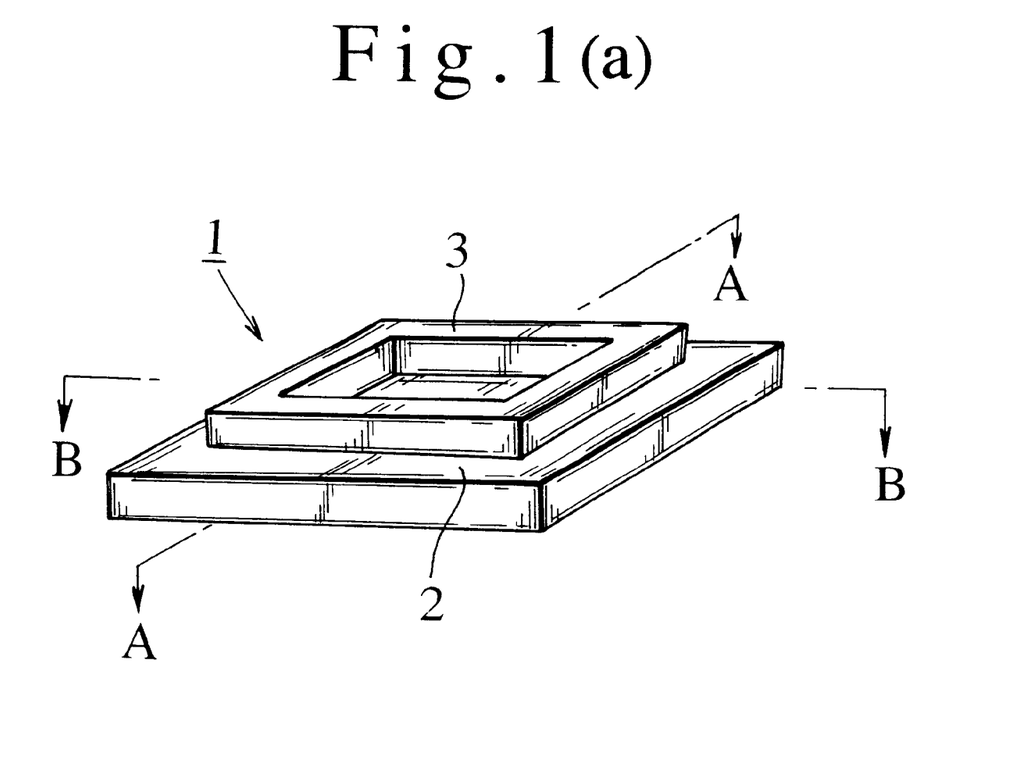
FIG. 1(a) shows the metal mold for effecting the male vacuum forming on determining the grain retention rate in a perspective view.
Figure 1B:
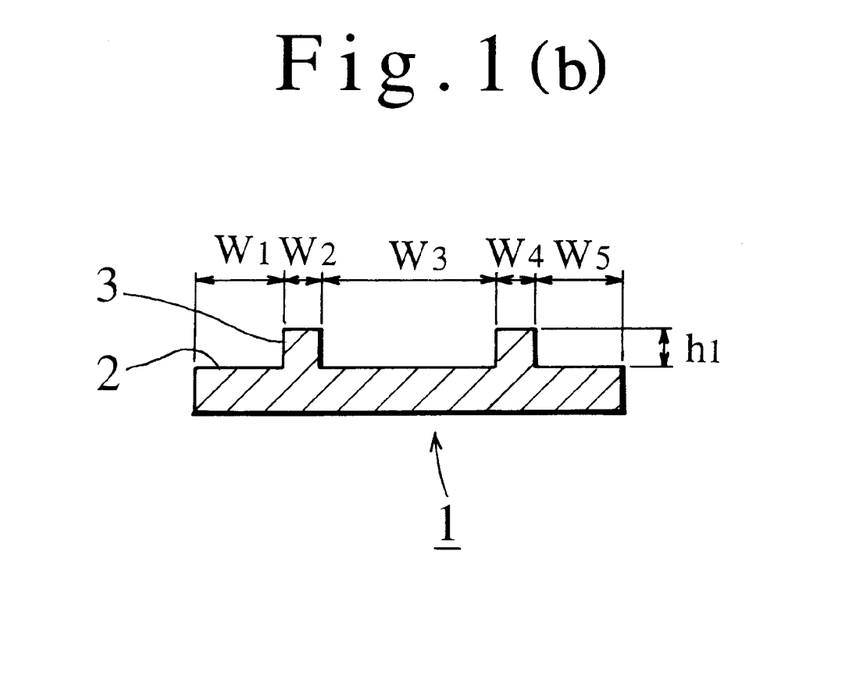
FIG. 1(b) shows the vertical section of the metal mold of FIG. 1(a) along the line A—A or B—B thereof, in which $W_1$, $W_5$=5 cm, $W_2$, $W_4$=2.5 cm, $W_3$=15 cm and $h_1$=3 cm.

The olefinic thermoplastic elastomer according to the present invention should have a characteristic feature that it satisfies, when a grained sheet made of the said elastomer is subjected to a male vacuum forming at least at a point of sheet temperature within the range of 130–150° C., the condition that the grain retention rate expressed by the proportion of the grain depth of the sheet retained after the male vacuum forming relative to the grain depth before the male vacuum forming represented by percent meets the relation defind by the following equations (1) to (1")

$$\% \text{ retention of grain} \geq 100-2.0 \times (T-120) \tag{1}$$

preferably $$\% \text{ retention of grain} \geq 100-2.0 \times (T-125) \tag{1'}$$

more preferably $$\% \text{ retention of grain} \geq 100-2.0 \times (T-130) \tag{1"}$$

in which T represents the sheet temperature upon the male vacuum forming. For this male vacuum forming, a metal mold as illustrated by the appended FIGS. 1(a) and 1(b) is used.

Figure 2A:
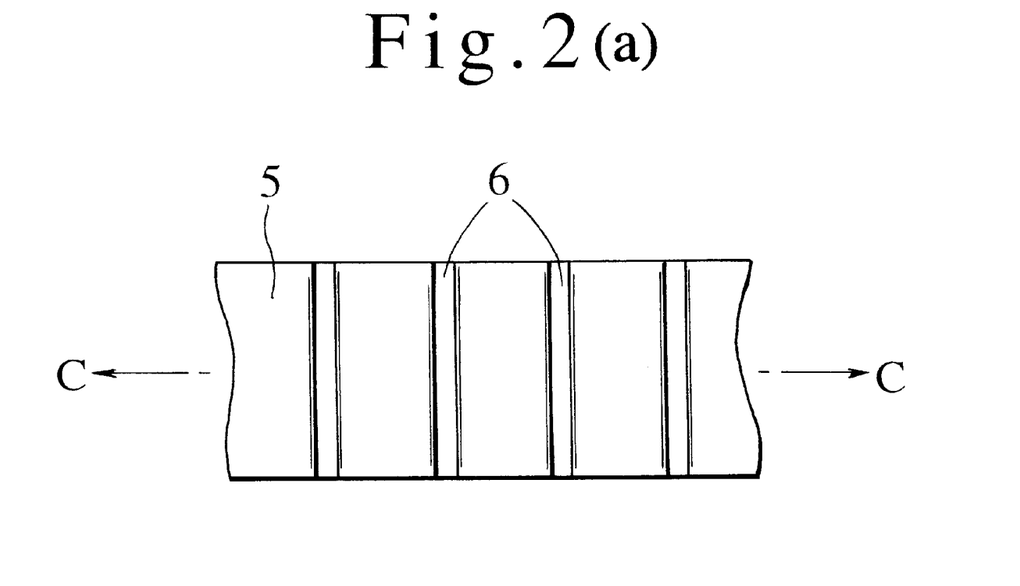
FIG. 2(a) is a top plan view of the grained sheet to be examined for its grain retention rate.
Figure 2B:
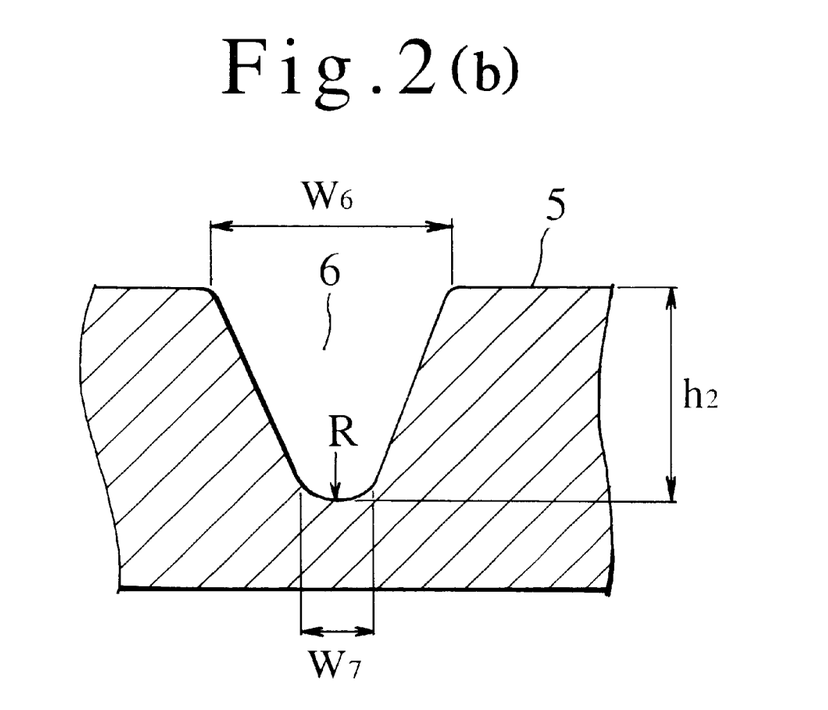
FIG. 2(b) shows the vertical section of the grained sheet of FIG. 2(a) along the line A—A thereof, in which $W_6$=250 μm, $W_7$=5 μm, $h_2$=320 μm and R=150 μm.

The grained sheet, for which the grain retention rate is determined, is prepared by extruding the olefinic thermoplastic elastomer by an extrusion sheet molding machine equipped with a T-die at a die temperature adjusted at 210° C. and passing the extruded sheet through a roll gap between a graining roll (roll temperature=90° C.) and a pinch roll disposed directly after the T-die. The grained sheet has a thickness of 0.5 mm and a maximum grain depth of 320 μm. Grains are formed on one side face of the sheet. An exemplary grain embossed on a sheet is shown in FIGS. 2(a) and 2(b). FIG. 2(a) shows a top plan view of the grained sheet and FIG. 2(b) is a partial vertical section along the line C—C of FIG. 2(a). The sheet 5 is provided on its outer face with a plurality of grains as embossed parallel grooves (6). The grooves are formed in V-shape in their sections with its bottom top having curvature. The sizes are: $W_6$=250 μm, $W_7$=75 μm, $h_2$=320 μm and the radius of curvature R at the bottom 150 μm, $h_2$ is the grain depth.

For carrying out the male vacuum forming for the grained sheet, a sample sheet of a size of 35×35 cm is cut out from the grained sheet and is subjected to a male vacuum forming, using a metal mold as shown in FIGS. 1(a) and 1(b) provided with perforations for evacuation (not shown), at a sample temperature of 130–150° C., by placing the sample sheet on the metal mold with the grained face thereof outwards and evacuating the interspace between the metal mold and the sample sheet to cause the sample sheet to fit tightly onto the metal mold. FIG. 1(a) shows the metal mold in a perspective view and FIG. 1(b) shows the vertical section thereof along the line A—A or the line B—B. The metal mold 1 has a shape in which a ridge 3 protrudes from the flat mold face 2, wherein $W_1$ and $W_5$ are both 5 cm, $W_2$ and $W_4$ are both 2.5 cm, $W_3$ amounts to 15 cm and $h_1$ is 3 cm. No grains are formed on the metal mold of FIG. 1.

After the male vacuum forming as above, the grain depth is measured in a area corresponding to the center of the mold, in order to estimate the grain depth retention rate represented by percent of the grain depth retained after the male vacuum forming relative to the grain depth before the male vacuum forming. The grain depth may be determined by, for example, observing the vertical section of the grain under a microscope.

By the way, it is to be pointed out that the above described practice of preparing the grained sheet and graining technique was incorporated only for preparing the testing sheet and the grained sheet according to the present invention can be produced by any pertinent technique.

The olefinic thermoplastic elastomer according to the present invention is one which comprises a polyolefin resin and an olefinic copolymer rubber, preferably one which is obtainable by subjecting a polyolefin resin and an olefinic copolymer rubber to a dynamic heat treatment in the presence of a cross linking agent, and has a characteristic feature that the grained sheet made therefrom exhibits a grain retention rate which satisfies the condition as defined by the equation (1).

For the starting material for the olefinic thermoplastic elastomer according to the present invention, it is preferable to use concurrently a polypropylene resin (A) having a melt flow rate (ASTM D 1238-65T, determined at 230° C. under a load of 2.16 kg) in the range of 0.1 to 3 g/10 min.; an ethylenic copolymer rubber (B) which is produced from ethylene, an α-olefin having 3–20 carbon atoms and an optionally incorporated non-conjugated polyene; and a polyethylene resin (C), wherein a particular preference is given to concurrent use of the polypropylene resin (A) in an amount of 10 to 60% by weight, the ethylenic copolymer rubber (B) in an amount of 37 to 87% by weight and the polyethylene resin (C) in an amount of 3 to 30% by weight, preferably the polypropylene resin (A) in an amount of 15 to 55% by weight, the ethylenic copolymer rubber (B) in an amount of 40 to 80% by weight and the polyethylene resin (C) in an amount of 5 to 25% by weight. When these components are used in a proportion as given above, an olefinic thermoplastic elastomer which is superior especially in the ability of grain retention upon the male vacuum formation as having the characteristic feature of satisfying the condition defined by the equations (1) to (1") can easily be obtained by subjecting a mixture comprising these components to a dynamic heat treatment in the presence of a cross linking agent.

The polypropylene resin (A) to be used as one of the starting materials of the olefinic thermoplastic elastomer according to the present invention may favorably have a melt flow rate (in the following, referred to as MFR, determined according to ASTM D1238-65T at 230° C. under a load of 2.16 kg) in the range from 0.1 to 3 g/10 min., preferably in the range from 0.2 to 1.5 g/10 min. When the MFR of the polypropylene resin (A) is in the above range of 0.1 to 3 g/10 min., an olefinic thermoplastic elestomer having the characteristic feature of satisfying the condition defined by the equations (1) to (1') and, especially, exhibiting a superior grain retention performance of a sheet made therefrom upon the male vacuum forming can be obtained easily.

For the polypropylene resin (A), there may be used a homopolymer of propylene, a block-copolymer of propylene with an α-olefin having 2–20 carbon atoms (excluding propylene), preferably 2–10 carbon atoms, or a random copolymer of propylene with an α-olefin having 2–20 carbon atoms (excluding propylene), preferably 2–10 carbon atoms, In the case of copolymer, the propylene content therein may favorably be at least 80 mole %, preferably at least 85 mole %.

For the α-olefin other than propylene constituting the polypropylene resin (A), there may be recited, for example, ethylene, 1-butene, 1-pentene, 1-hexene, 1-octene, 1-decene, 2-methyl-1-propene, 3-methyl-1-pentene, 4-methyl-1-pentene and 5-methyl-1-hexene. These α-olefins may be employed either alone of in a combination of two or more of them.

For the polypropylene resin (A), either isotactic polypropylene and syndiotactic polypropylene can be used.

The polypropylene resin (A) may be used either alone or in a combination of two kinds of such resins.

The ethylenic copolymer rubber (B) to be used as one of the starting materials of the olefinic thermoplastic elastomer according to the present invention may favorably be an ethylene/α-olefin copolymer rubber which is an amorphous random elastomeric copolymer constituted of ethylene and an α-olefin having 3 to 20, preferably 3 to 10 carbon atoms or be a copolymer rubber of an ethylene/α-olefin/non-conjugated polyene which is an amorphous random elastomeric copolymer constituted of ethylene, an α-olefin having 3 to 20, preferably 3 to 10 carbon atoms, and a non-conjugated polyene.

The ethylenic copolymer rubber (B) may favorably have a content of ethylene in the range from 50 to 95 mole %, preferably from 50 to 90 mole %, more preferably from 60 to 85 mole %, and a content of the α-olefin having 3 to 20 carbon atoms in the range from 5 to 50 mole %, preferably from 10 to 50 mole %, more preferably from 15 to 40 mole %.

The ethylenic copolymer rubber (B) may favorably have a Mooney viscosity $\{ML_{1+4} (100° C.)\}$ in the range from 10 to 250, preferably from 30 to 150.

The ethylenic copolymer rubber (B) may favorably have an iodine value of not higher than 30, preferably not higher than 25. When the iodine value of the ethylenic copolymer rubber (B) is not higher than 30, an olefinic thermoplastic elastomer having a proper cross linking structure can be obtained.

As the α-olefin constituting the ethylenic copolymer rubber (B) other than ethylene, there may be recited, for example, propylene, 1-butene, 1-pentene, 1-hexene, 1-octene, 1-decene, 2-methyl-1-propene, 3-methyl-1-pentene, 4-methyl-1-pentene and 5-methyl-1-hexene. These α-olefins may be employed either alone or in a combination of two or more of them.

As the non-conjugated polyene constituting the ethylenic copolymer rubber (B), there may be recited, for example, dicyclopentadiene, 1,4-hexadiene, cyclo-octadiene, methylenenorbornene, ethylidenenorbornene and vinylnorbornene.

Concrete examples of the ethylenic copolymer rubber (B) include the followings:

(1) An ethylene/α-olefin copolymer rubber with an ethylene/α-olefin mole ratio in the range from about 95/5 to about 50/50

(2) An ethylene/α-olefin/non-conjugated polyene copolymer rubber with an ethylene/α-olefin mole ratio in the range from about 95/5 to about 50/50

As the ethylenic copolymer rubber (B), ethylene/propylene copolymer rubber, ethylene/propylene/non-conjugated polyene copolymer rubber, ethylene/1-butene copolymer rubber and ethylene/1-butene/non-conjugated polyene copolymer rubber are preferred, wherein a particular preference is given to ethylene/propylene/non-conjugated polyene copolymer rubber, above all, to ethylene/propylene/ethylidenenorbornene copolymer rubber and ethylene/propylene/dicyclopentadiene copolymer rubber, in view of that an olefinic termoplastic elastomer having a proper cross linking structure can be obtained.

The ethylenic copolymer rubber (B) may be used either alone or in a combination of two or more kinds of such rubbers.

The polyethylene resin (C) to be used as one of the starting materials of the olefinic thermoplastic elastomer according to the present invention may favorably be a homopolymer of ethylene or a random- or block-copolymer of ethylene with an α-olefin having 3 to 20 carbon atoms, preferably 4 to 8 carbon atoms. In the case of the copolymer, the ethylene content therein may favorably be in the range from 85 to 99.9 mole %, preferably from 90 to 99 mole %, more preferably from 95 to 99 mole %. As the α-olefin other than ethylene constituting the polyethylene resin (C), those which are exemplified for the ethylenic copolymer rubber (B) may be exemplified.

As the polyethylene resin (C), those which have densities in the range from 0.880 to 0.940 g/cm$^3$, preferably from 0.885 to 0.935 g/cm$^3$, more preferably from 0.895 to 0.930 g/cm$^3$ are preferred.

As the polyethylene resin (C), those which have MFRs (ASTM D 1238-65T, 190° C., 2.16 kg load) in the range from 0.1 to 50 g/10 min., preferably from 1 to 30 g/10 min., more preferably from 5 to 25 g/10 min. are preferred.

When the polyethylene resin (C) is used concurrently with the polypropylene resin (A), an olefinic thermoplastic elstomer which is processed into a sheet exhibiting, in particular, superior grain retention performance upon the male vacuum forming can easily be obtained.

The polyethylene resin (C) may either be used alone or in a combination of two or more of such resins.

The olefinic thermoplastic elastomer according to the present invention may comprise a softener (D). As the softener to be incorporated according to the present invention, there may be exemplified those which are incorporated in conventional rubbers.

Concrete examples of the softener (D) include petroleum base substances, such as process oils, lubricating oils, paraffins, liquid paraffins, petroleum asphalt and vaseline; coal tars, such as coal tar and coal tar pitch; fatty oils, such as castor oil, linseed oil, rapeseed oil, soybeen oil and palm oil; waxes, such as tall oil, beeswax, carnauba wax and lanoline; fatty acids and their metal salts, such as ricinoleic acid, palmitic acid, stearic acid, barium stearate and calcium stearate; synthetic polymeric substances, such as petroleum resin, cumarone-indene resin and atactic polypropylene; plasticizers based on esters, such as dioctyl phthalate, dioctyl adipate and dioctyl sebacate; and others including microcrystalline wax, sub(factice), liquid polybutadiene, modified liquid polybutadiene and liquid Thiokol.

The softener (D) may favorably be incorporated in a proportion in the range from 10 to 200 parts by weight, preferably from 15 to 140 parts by weight, per 100 parts by weight of the ethylenic copolymer rubber (B). When the softener (D) is used in the proportion as above, the resulting olefinic thermoplastic elastomer will be superior in the flowability during the forming process and the formed article obtained thereform will be superior in the heat resistance and in the mechanical properties.

The olefinic thermoplastic elastomer according to the present invention may comprise, within the range not obstructing the purpose of the invention, rubber(s) other than the ethylenic copolymer rubber (B). Such other rubber (s) include, for example, butyl rubber, polyisobutylene rubber, styrene/butadiene rubber (SBR) or its hydrogenated product (H-SBR), styrene/butadiene block-copolymer rubber (SBS) or its hydrogenated product (SEBS), styrene/isoprene block-copolymer rubber (SIS) or its hydrogenated product (SEPS, HV-SIS), nitrile rubber (NBR), natural rubber (NR) and silicone rubber.

The olefinic thermoplastic elastomer according to the present invention may comprise, within the range not obstructing the purpose of the invention, inorganic filler. Concrete examples of the inorganic filler include calcium carbonate, calcium silicate, clay, kaolin, talc, silica, diatomaceous earth, powdery mica, asbestos, alumina, barium sulfate, aluminum sulfate, calcium sulfate, basic magnesium carbonate, molybdenum disulfide, graphite, glass fiber, glass beads, sirasu balloon, basic magnesium sulfate whisker, calcium titanate whisker and aluminum borate whisker.

The olefinic thermoplastic elastomer according to the present invention may further comprise, within the range not obstructing the purpose of the invention, other ingredients known per se, such as heat stabilizer, antioxidant, weathering stabilizer, antistatic agent, metal soaps and waxes.

The olefinic thermoplastic elastomer according to the present invention is obtained by subjecting a blend of the polypropylene resin (A), the ethylenic copolymer rubber (B), the polyethylene resin (C), the optionally incorporated softener (D) and optionally incorporated other component (s), such as other rubber(s), inorganic filler and other ingredient(s) to a dynamic heat treatment in the presence of a cross linking agent to effect cross linking of the blend.

In the context of the present application, the wording "subjected to a dynamic heat treatment" means that the blend is kneaded in a molten state. As the cross linking agent to be used on the dynamic heat treatment, those which have been used in general in thermosetting rubbers may be employed, such as for example, organic peroxides, sulfur, phenol resins, amino resins, quinone and its derivatives, compounds based on amine, azo compounds, compounds based on epoxide and isocyanates. Among them, preference is given, in particular, to organic peroxides.

As the organic peroxides, there may be recited, for example, dicumyl peroxide, di-tert-butyl peroxide, 2,5-dimethyl-2,5-di-(tert-butylperoxy)hexane, 2,5-dimethyl-2, 5-di-(tert-butylperoxy)hexine-3, 1,3-bis(tert-butylperoxyisopropyl)benzene, 1,1-bis(tert-butylperoxy)-3, 3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butyl peroxybenzoate, tert-butylperoxyisopropyl carbonate, diacetyl peroxide, lauroyl peroxide and tert-butylcumyl peroxide.

Among them, in respect of odor and of scorching stability, 2,5-dimethyl-2,5-di-(tert-butylperoxy)hexane, 2,5-dimethyl-2,5-di-(tert-butylperoxy)hexine-3 and 1,3-bis(tert-butylperoxyisopropyl)benzene are preferable, with special preference to 2,5-dimethyl-2,5-di-(tert-butylperoxy)hexane.

The amount of the cross linking agent, such as organic peroxide or so on, to be incorporated may favorably be in the range from 0.02 to 3 parts by weight, preferably from 0.05 to 2 parts by weight, per 100 parts by weight of the total sum of, on the one hand, the polypropylene resin (A), the ethylenic copolymer rubber (B) and the polyethylene resin (C) or, on the other hand, the polypropylene resin (A), the ethylenic copolymer rubber (B), the polyethylene resin (C) and the softener (D). When the amount of the cross linking agent incorporated is in the above range, an olefinic thermoplastic elastomer superior in the heat resistance, in the tensile characteristics, in the strain restorability and in the repulsive elasticity and so on can be obtained.

In the case where the organic peroxide is employed, a cross linking assistant may also be incorporated. Concrete examples of the cross linking assistant include divinyl compounds, such as divinylbenzene; oximes, such as p-quinone dioxime and p,p'-dibenzoylquinone dioxime; nitroso compounds, such as N-methyl-N-4-dinitrosoaniline and nitrosobenzene; maleimides, such as trimethylolpropane-N,N'-m-phenylene dimaleimide; and others including sulfur, diphenyl-guanidine and triallyl cyanurate. Other cross linking assistants include polyfunctional methacrylate monomers, such as ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By using the above-mentioned cross linking assistant, a homogeneous and mild cross linking reaction may be expected. As the cross linking assistant, divinylbenzene is at most preferable. Divinylbenzene is easy to handle, better in the compatibility with the blend to be cross-linked and has a function of solubilizing organic peroxides so as to be served as a dispersant for the organic peroxide, whereby an olefinic thermoplastic elastomer having a better balance between the flowability and the material properties can be obtained, since the effect of cross linking by the heat treatment is uniformly distributed.

The cross linking assistant may be incorporated usually in an amount of not higher than. 3 parts by weight, preferably in the range from 0.3 to 2 parts by weight, per 100 parts by weight of the total sum of the polypropylene resin (A), the ethylenic copolymer rubber (B) and the polyethylene resin (C) or the total sum of the polypropylene resin (A), the ethylenic copolymer rubber (B), the polyethylene resin (C) and the softener (D).

It is permitted to incorporate a decomposition accelerator for accelerating the decomposition of the organic peroxide, the said accelerator including, for example, tertiary amines, such as triethylamine, tributylamine and 2,4,6-tri (dimethylamino)phenol; and salts of naphthenic acid of, for example, aluminum, cobalt, vanadium, copper, calcium, zirconium, manganese, magnesium, lead and mercury.

The dynamic heat treatment according to the present invention may favorably be performed in a non-open apparatus under an inert atmosphere, such as nitrogen or carbon dioxide. The temperature for the heat treatment may be in the range from the melting point of the polypropylene resin (A) to 300° C. and may usually be in the range from 150 to 270° C., preferably from 170 to 250° C. The duration of kneading may usually be in the range from 1 to 20 minutes, preferably from 1 to 10 minutes. The kneading is carried out favorably at a shearing force expressed by the shear rate in the range from 10 to 50,000 sec$^{-1}$, preferably from 100 to 10,000 sec$^{-1}$.

As the kneading apparatus, there may favorably be emplyed, for example, a mixing roll, an intensive mixer (such as Bumbury's mixer or a kneader) or a single- or twin screw extruder, wherein a non-open apparatus is peferred.

By the dynamic heat treatment, an olefinic thermoplastic elastomer in which the ethylenic copolymer rubber (B) and the polyethylene rein (C) are bridged by cross linking is obtained. Here, the olefinic thermoplastic elastomer is cross-linked and this means that the gel content of the olefinic thermoplastic elastomer determined by the method given below is higher than 20% by weight.

The olefinic thermoplastic elastomer according to the present invention may favorably have a gel content determined by the method described below in the range from above 20% by weight to below 97% by weight, preferably from above 45% by weight to below 97% by weight. When the gel content of the olefinic thermoplastic elastomer according to the present invention is in the above range, the formability of a sheet produced therefrom is superior so that breaking down of the sheet upon the vacuum forming thereof at high temperature is avoided.

<<Method for Gel Content Determination>>

A sample of 100 mg of the olefinic thermoplastic elastomer is taken and is cut into dices of a size of 0.5 mm×0.5 mm×0.5 mm, whereupon the granulated sample is soaked in 30 ml of cyclohexane in a tightly sealed vessel and is kept at 23° C. for 48 hours. Then, the soaked sample is taken out and transferred onto a filter paper and is dried at room temperature for over 72 hours until a constant weight is reached.

A value subtracting the weight of all the components insoluble in cyclohexane other than the polymeric components (fibrous filler, inorganic filler, pigment and so on) and the weight of the polypropylene resin (A) in the original sample (before the soaking in cyclohexane) from the actually detected weight of the dried residue is assumed as "the corrected final weight (Y)".

On the other hand, the total sum of the weights of the cross-linkable components in the sample, namely, for example, in the case of using an organic peroxide as the cross linking agent, the weight of the ethylenic copolymer rubber (B) plus the weight of the polyethylene resin (C), is assumed as "the corrected original weight (X)".

The gel content is determined by the following equation (2):

$$\text{Gel content (wt. \%)} = \{(Y)/(X)\} \times 100 \qquad (2)$$

The olefinic thermoplastic elastomeric composition according to the present invention is a mixture of the olefinic thermoplastic elastomer described above and the crystalline polyolefin resin (E).

As the crystalline polyolefin resin (E), any solid crystalline polymeric substance obtained by polymerizing at least one α-olefin having 2 to 20 carbon atoms, preferably 2 to 8 carbon atoms, can be used without restriction. In the case of a copolymer, it may be either a random- or a block-copolymer. For the polymerization, either high-pressure process and low-pressure process may be used. For such crystalline polyolefin resins, there may be recited, for example, isotactic and syndiotactic monoolefinic polymers. Typical resins therefor are commercially available.

The crystalline polyolefin resin (E) may be incorporated either alone or in a combination of two or more of such resins.

As the α-olefin constituting the crystalline polyolefin resin (E), there may be recited, for example, ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene.

As the crystalline polyolefin resin (E), those which fall under the polypropylene resin (A) and under the polyethylene resin (C) may also be employed.

As the crystalline polyolefin resin (E), those which have MFRs (ASTM D 1238-65T, 230° C., 2.16 kg load) in the range from 0.05 to 100 g/10 min., preferably from 0.1 to 10 g/10 min., are favorable. Particularly, low density polyethylene, low density linear polyethylene, polypropylene and polybutene-1 are preferred.

The content of the crystalline polyolefin resin (E) in the olefinic thermoplastic elastomeric composition may be in the range from 20 to 200 parts by weight, preferably from 20 to 120 parts by weight, per 100 parts by weight of the olefinic thermoplastic elastomer according to the present invention.

By compounding the crystalline polyolefin resin (E) in the above-mentioned range, the flowability and the heat resistance of the olefinic thermoplastic elastomer is improved, whereby the formability of the sheet made therefrom can be improved.

The olefinic thermoplastic elastomer according to the present invention is superior in, for example, the formability, heat resistance, mechanical properties, tensile characteristics, strain restorability and repulsive elasticity, together with superior grain retention ability for the sheet made therefrom upon vacuum forming, in particular, male vacuum forming thereof. In the olefinic thermoplastic elastomeric composition according to the present invention, especially the olefinic thermoplastic elastomer is improved in the flowability, in the heat resistance and in the formability of sheet made therefrom. The olefinic thermoplastic elastomer and the olefinic thermoplastic elastomeric composition according to the present invention are favorable, therefore, for application in the technical field requiring characteristic features as given above and can, in particular, be used favorably as the raw material for sheets and for the covering skin sheets of interior furnishings in automobile.

The sheet according to the present invention is made of the olefinic thermoplastic elastomer according to the present invention or of the olefinic thermoplastic elastomeric composition according to the present invention and is used usually with graining on the sheet face. The sheet according to the present invention can be produced in an ordinary technique using a plastic material processing machine, such as an extrusion sheet molding machine equipped with a T-die, a calendering forming machine or the like. The graining may be effected by conventional practice by, for example, passing the freshly produced sheet through the roller gap between a graining roll and a pinch roll.

The sheet according to the present invention can be processed by, for example, a vacuum forming, in particular, male vacuum forming, into desired shapes to use as, for example, covering skin sheets for interior furnishings in automobile. In such a case, the sheet according to the present invention is superior in the grain retention performance to maintain the decorative patters provided on the sheet surface.

The sheet according to the present invention may be coated with a top coat layer containing known film-forming resin. As the resin constituting the top coat layer, there may be enumerated, for example, at least one kind selected from the group consisting of polyurethane, saturated polyesters, polyacrylates, polyvinyl chloride and polyisocyanates. Concretely, as the saturated polyesters, there may be enumerated polyethylene terephthalate, polybutylene terephthalate and derivatives of them. As the polyacrylates, there may be enumerated polymethyl acrylate, polyisobutyl acrylate, poly-2-ethylhexyl acrylate, polymethyl methacrylate, polyisobutyl methacrylate, poly-2-ethylhexyl methacrylate and so on. As the polyisocyanates, there may be enumerated polyhexamethylene diisocyanate, polyisophorone diisocyanate and so on.

The thickness of the top coat layer may favoarbly be in the range from 5 to 300 µm, preferably from 10 to 100 µm. It is possible to interpose a primer layer comprised of a known material between the covering skin sheet and the top coat layer.

The laminated product according to the present invention is made by laminating the sheet according to the present invention as the external layer and a substrate constituted of a polyolefin foamed product.

As the polyolefin resin for the foamed substrate, there may be recited those which fall under the crystalline polyolefin resin (E). For the foamed polyolefin resin, in particular, foamed resins of polyethylene and polypropylene are favorable. The foamed polyolefin resin may be crosslinked foamed resin. The foaming magnification of the polyolefin foamed resin may favorably be in the range from 3 to 50 times.

The thickness of the skin sheet external layer may favorably be in the range from 0.2 to 1.5 mm, preferably from 0.3 to 1 mm, and the thickness of the substrate may favorably be in the range from 1 to 5 mm, preferable from 1.5–4 mm.

The polyolefin foamed product can be produced by heating a mixture comprised of the polyolefin resin and a foaming propellant at a temperature above the softening point of this mixture. It is also possible to produce the foamed polyolefin product by heating a mixture comprised of the polyolefin resin, a foaming propellant and a cross linking agent at a temperature above the softening point of this mixture.

As the foaming propellant, there may be recited, for example, azobis(formamide), diazoaminobenzene, N,N'-dinitrosopentamethylenetetramine, N,N'-dimethyl-N,N'-dinitrosoterephthalimide, P,P'-oxy-bis(benzenesulfonyl semicarbazide), azobis(isobutyronitrile), P,P'-oxy-bis(benzenesulfonyl hydrazide), benzenesulfonyl hydrazide, m-benzene-bis(sulfonyl hydrazide), monochlorotrifluoromethane, monochlorodifluoromethane, butane, pentane and hexane.

As the cross linking agent, there may be recited, for example, poly(sulfonazide)s, such as 1,7-heptane-bis(sulfonazide), 1,11-undecane-bis(sulfonazide), 1,12-dodecane-bis(sulfonazide), 1,9,18-octadecane-tris(sulfonazide), poly(ethylenesulfonazide), 1,3-benzene-bis(sulfonazide), 1-octyl-2,4,6-benzene-tris(sulfonazide), 4,4,-diphenylmethane-bis(sulfonazide) and 4,4'-diphenyldisulfido-bis(solfonazide); azide formates, such as n-octadecylazide formate, tetramethylene-bis(azide formate), phenylazide formate, 2,2'-isopropylidene-bis(P,P'-phenylazide formate), 2,2'-oxydiethyl-bis(azide formate), 2,2'-ethylenedioxydiethyl-bis(azide formate) and 2,2'-thiodiethyl-bis(azide formate); and aromatic polyazides, such as m-phenylene diazide, 2,4,6-triazidobenzene and 4,4'-diazidophenylamine.

The method for producing the cross-linked foamed product may be that described in Japanese Patent Publications Sho 39-25500 B, Sho 40-25351 B or Sho 40-25352 B. A foamed cross-linked product cross-linked by irradiation of a radiant ray may also be employed. For the polyolefin foames product, a commercially available article may be used as such.

The laminated product according to the present invention can be produced by extruding a sheet from the olefinic thermoplastic elastomer or the olefinic thermoplastic elastomeric composition according to the present invention by an extruding machine equipped with T-die and passing the extruded sheet in still molten state together with the foamed polyolefin product sheet in a laminated form through the roll gap between a pair of rolls. Here, it is possible to effect graining on the external layer made of the olefinic thermoplastic elastomer or the olefinic thermoplastic elastomeric composition simultaneously with the lamination.

It is possible also to apply a top coat as mentioned above to the resulting laminated product.

The covering skin sheet according to the present invention for interior furnishings in automobile is made of the olefinic thermoplastic elastomer, the olefinic thermoplastic elastomeric composition, the sheet or the laminated product described above according to the present invention.

The laminated product or the covering skin sheet according to the present invention may be used for the skin layer of interior furnishings in automobile, such as door trim, instrument pannel, ceiling, steering wheel, console box and seat. The covering skin sheet of the interior funishings in the automobile is prepared usually by processing the sheet according to the present invention by a vacuum forming, in particular, by male vacuum forming, wherein the sheet exhibit here also a superior grain retention performance and the decorative patterns provided on the outer face of the grained sheet is maintained as such.

The olefinic thermoplastic elastomer according to the present invention is superior in the formability, heat resistance, mechanical properties, tensile characteristics, strain restorability, repulsive elasticity and so on together with superior grain retention ability on vacuum forming, especially on male vacuum forming, of the grained sheet made therefrom, since the grained sheet made therefrom has the characteristic feature that the relation between the grain retention rate and the sheet temperature meets the condition defined by the equation (1).

The olefinic thermoplastic elastomer according to the present invention, as obtained by processing a blend composed of, in a specific proportion, a polypropylene resin having a specific MFR, an ethylenic copolymer rubber and a polyethylene resin by a dynamic heat treatment in the presence of a cross linking agent, is superior in the formability, heat resistance, mechanical properties, tensile characteristics, strain restorability, repulsive elasticity and so on together with superior grain retention ability on vacuum forming, especially on male vacuum forming, of the grained sheet made therefrom.

The olefinic thermoplastic elastomeric composition according to the present invention is improved in the flowability and heat resistance of the olefinc thermoplastic elastomer and in the formability of the sheet made therefrom, since the olefinic thermoplastic elastomer and the crystalline polyolefin resin are contained each in a specific proportion.

The sheet according to the present invention is superior in the heat resistance, mechanical properties, tensile characteristics, strain restorability, repulsive elasticity and so on together with superior grain retention ability on vacuum forming, especially on male vacuum forming, of the grained sheet made therefrom, since the sheet is made from the olefinic thermoplastic elastomer or from the olefinic thermoplastic elastomeric composition described above.

The laminated product according to the present invention is superior in the heat resistance, mechanical properties, tensile characteristics, strain restorability, repulsive elasticity and so on together with superior grain retention ability on vacuum forming, especially on male vacuum forming, of the grained sheet made therefrom, since the laminated product has an external layer composed of the sheet mentioned above.

The covering skin sheets for interior furnishings according to the present invention is superior in the heat resistance, mechanical properties, tensile characteristics, strain restorability, repulsive elasticity and so on together with superior grain retention ability on vacuum forming, especially on male vacuum forming, of the grained sheet made therefrom, since the coverage skin sheet is made from the olefinic thermoplastic elastomer or from the olefinic thermoplastic elastomeric composition described above.

The Best Mode for Embodying the Invention

Below, the present invention is described by way of Examples. However, the present invention is not restricted by these Examples. The materials for the components used in these Examples are as follows:

<<The Polypropylene Resin (A)>>
(A-1): A homopolymer of propylene having an MFR (ASTM D 1238-65T, 230° C., 2.16 kg load) of 0.5 g/10 min.
(a-1): A homopolymer of propylene having an MFR (ASTM D 1238-65T, 230° C., 2.16 kg load) of 20 g/10 min.

<<The Ethylenic Copolymer Rubber (B)>>
(B-1): An ethylene/propylene/5-ethylidene-2-norbornene copolymer rubber having an ethylene/propylene mole ratio of 80/20, an iodine value of 12 and a Mooney viscosity $ML_{1+4}$ (100° C.) of 150;
formulated as an oil-extended mixture of 100 parts by weight of this copolymer rubber and 40 parts by weight of a softening agent (D) extended by an oil DYNA PROCESS OIL PW-380 (trademark) of Idemitsu Kosan Co., Ltd.
(B-2): An ethylene/propylene/dicyclopentadiene copolymer rubber having an ethylene/propylene mole ratio of 79/21, an iodine value of 6 and a Mooney viscosity $ML_{1+4}$ (100° C.) of 150; formulated as an oil-extended mixture of 100 parts by weight of this copolymer rubber and 40 parts by weight of a softening agent (D) extended by an oil DYNA PROCESS OIL PW-380 (trademark) of Idemitsu Kosan Co., Ltd.

<<The Polyethylene Resin (C)>>
(C-1): An ethylene/4-methyl-1-pentene random copolymer having an ethylene content of 97 mole %, a density of 0.920 g/cm³ and an MFR (ASTM D 1238-65T, 190° C., 2.16 kg load) of 20 g/10 min.

<<The Crystalline Polyolefin Resin (E)>>
(E-1): An ethylene/4-methyl-1-pentene random copolymer having an ethylene content of 97 mole %, a density of 0.920 g/cm³ and an MFR (ASTM D 1238-65T, 190° C., 2.16 kg load) of 2 g/10 min.
(E-2): A propylene/ethylene random copolymer having a propylene content of 97 mole % and an MFR (ASTM D 1238-65T, 230° C., 2.16 kg load) of 2 g/10 min.

EXAMPLE 1

40 parts by weight of a pelletized product of the homopolymer of propylene (A-1), 60 parts by weight of the pelletize product of the ethylene/propylene/5-ethylidene-2-norbornene copolymer rubber (B-1), 0.3 part by weight of 2,5-dimethyl-2,5-di(tert-butylperoxy)-hexane as an organic peroxide and 0.4 part by weight of divinylbenzene were blended sufficiently on a Henschel mixer, whereupon the resulting blend was supplied to a twin screw extruding machine to subject the blend to a dynamic heat treatment at a temperature of 220° C. to obtain a pelletized product of the olefinic thermoplastic elastomer.

A mixture of 100 parts by weight of the above pelletized olefinic thermoplastic elastomer and 25 parts by weight of a pelletized product of ethylene/4-methyl-1-pentene random copolymer (E-1) was supplied to an extruding machine equipped with a 65 mm φ T-die (with a full flight screw, L/D=26, coat hanger die) to extrude a sheet at 210° C., whereupon the so-extruded sheet in a still molten state is put together with a cross-linked polyethylene foamed sheet (a product of Sekisui Chemical Co., Ltd. with trademark SOFTRON; a foaming volume magnification of 30 times; a thickness of 3 mm) and the resulting composite sheet was passed through a roll gap between a smooth roll and a graining (embossing) roll. Here, the sheet of the olefinic thermoplastic elastomeric composition was on the side contacting with the graining roll held at a roll temperature of 90° C. and the cross-linked foamed sheet was on the side contacting with the mirror-polished smooth roll held at a roll temperature of 30° C., in order to produce a laminated product in a form of sheet having a thickness of the external skin layer made of the olefinic thermoplastic elastomeric composition of 0.5 mm.

Then, the resulting laminated product was coated once with a coating liquor for a primer coat containing 10 parts by weight of a chlorinated polypropylene, 2 parts by weight of anhydrous silicic acid and 88 parts by weight of toluene using a gravure roll of 120 mesh, whereupon the coated sheet was dried at 70° C. for 20 seconds. Onto this primer coating, a second primer coating liquor containing 8 parts by weight of polyvinyl chloride, 2 parts by weight of a pigment and 90 parts by weight of methyl ethyl ketone was applied by a gravure roll to print a pattern of a cloudy design thereon, whereupon the coating was dried again at 70° C. for 20 seconds.

Onto the resulting coated product, a coating liquor for top coat containing 5 parts by weight of polyvinyl chloride, 5 parts by weight of a polyacrylate, 3 parts by weight of anhydrous silisic acid and 87 parts by weight of methyl ethyl ketone was applied once by a gravure roll of 100 mesh and the so-coated product was dried at 70° C. for 20 seconds. The resulting top coat layer had a thickness of 30 μm.

The resulting laminated product was processed using a vacuum pneumatic forming machine Model CUPF-1115 of the firm Fuse Shinku K.K. by a male vacuum forming on a forming mold made of wood with a maximum extension proportion of 150×150% at a laminated product temperature of 130° C., 140° C. or 150° C.

For the male vacuum-formed products, the grain retention performance was estimated by the following 5-rank assessment criterion:
Score 5: the grain form did not change from the original.
Score 4: the grain form became slightly shallow than before the forming.
Score 3: the grain form became somewhat shallower than before the forming.
Score 2: the grain form became considerably shallower than before the forming.
Score 1: the grain form became very shallow than before the forming and almost faded out.

The results are given in Table 1.

On the other hand, a grained sheet was produced by extruding the pelletized product of the olefinic thermoplastic elastomer used as the raw material of the skin layer of the above laminated product by a sheet extrusion molding machine provided with a T-die settled at a temperature of 210° C., whereupon the extruded sheet was passed through a roll gap between a roll pair disposed directly after the extusion die composed of a graining roll of a roll temperature of 90° C. and a pinch roll, whereby a grained sheet as illustrated in FIGS. 2(a) and 2(b). The grained sheet had a thickness of 0.5 mm and a maximum grain depth of 320 μm. A sample sheet of a size of 35×35 cm was cut out from the grained sheet and was subjected to a male vacuum forming using the metal mold as shown in FIGS. 1(a) and 1(b) at a mold temperature of 130–150° C. by placing the sample sheet on the mold and evacuating the interspace between the metal mold and the sample sheet from the mold side to fit the sample sheet tightly onto the metal mold face. After this male vacuum forming, the proportion of the grain depth after the male vacuum forming to the original grain depth was detected in percent and was assumed as the grain retention rate. The grain depth was determined by detecting the vertical depth of the grain at a portion of the sample sheet corresponding to the center of the metal mold under a microscope. The results are recited in Table 1.

Comparative Example 1

The procedures of Example 1 were repeated except that the homopolymer of propylene (a-1) in the place of the homopolymer of propylene (A-1). The results are recited in Table 1.

EXAMPLES 2 and 3

Using the raw materials as given in Table 1 each in a proportion as given in Table 1, the procedures of Example 1 were repeated. The results are recited in Table 1.

TABLE 1

| | Blend amount in part by weight | | | |
|---|---|---|---|---|
| | Examp. 1 | Comp. Examp. 1 | Examp. 2 | Examp. 3 |
| Polypropylene resin | | | | |
| A-1 | 40 | — | 30 | 25 |
| a-1 | — | 40 | — | — |
| Ethyl. copolym. rubber | | | | |
| B-1 *1) | 43 | 43 | 36 | — |
| B-2 *1) | — | — | — | 43 |
| Polyethylene resin C-1 | — | — | 10 | 15 |
| Softener (D) *2) | 17 | 17 | 14 | 17 |
| Organic peroxide | 0.3 | 0.3 | 0.2 | 0.2 |
| Divinylbenzene | 0.4 | 0.4 | 0.2 | 0.3 |
| Thermopl. elastom. *3) | | | | |
| Gel cont. (wt. %) *4 | 95 | 94 | 92 | 93 |
| Amount blended Cryst. polyolef. resin | 100 | 100 | 100 | 100 |
| E-1 *5) | 25 | 25 | 35 | 60 |
| E-2 *5) | — | — | 15 | 40 |
| Grain retent. perform. | | | | |
| 130° C. | 5 | 4 | 5 | 5 |
| 140° C. | 4 | 3 | 5 | 5 |
| 150° C. | 3 | 2 | 4 | 4 |
| Grain retent. rate (%) | | | | |
| 130° C. | 91 | 77 | 93 | 94 |
| 140° C. | 78 | 58 | 85 | 87 |
| 150° C. | 63 | 35 | 71 | 75 |
| Value of equation (1) *6) | | | | |
| 130° C. | 80 | 80 | 80 | 80 |
| 140° C. | 60 | 60 | 60 | 60 |
| 150° C. | 40 | 40 | 40 | 40 |

What is claimed is:

1. An olefinic thermoplastic elastomer comprising an olefinic resin and an olefinic copolymer rubber, wherein when a grained sheet made of said elastomer is subjected to a male vacuum forming at least at a point of sheet temperature within the range of 130–150° C., using a testing metal mold as shown in FIG. 1(a) and FIG. 1(b), which metal mold has a ridge 3 protruding from the flat mold face 2 in the dimension that $w_1$ and $W_5$ are both 5 cm, $w_2$ and $w_4$ are both 2.5 cm, $W_3$ is 15 cm and $h_1$ is 3 cm, the grain retention rate of said sheet made of said elastomer, as expressed by the proportion of the grain depth of the sheet retained after being subjected to the male vacuum forming relative to the grain depth before being subjected to the male vacuum forming, meets the relation defined by the following inequality (1)

$$\% \text{ retention of grain} \geq 100-2.0\times(T-120) \quad (1)$$

in which T represents the sheet temperature (°C.) of said grained sheet, wherein the male vacuum forming is performed at the temperature T of said grained sheet within the range from 130° C. to 150° C.

2. An olefinic thermoplastic elastomer obtained by subjecting a rubber composition comprising
   (A) 10–60%, based on the total weight of the composition, of a propylene resin having a melt flow rate (according to ASTM D 1238-65T, determined at 230° C. under a load of 2.16 kg) in the range from 0.1 to 3 g/10 min.,
   (B) 37–87%, based on the total weight of the composition, of an ethylenic copolymer rubber made from ethylene, an α-olefin having 3–20 carbon atoms and an optionally incorporated non-conjugated polyene and
   (C) 3–30%, based on the total weight of the composition, of a polyethylene resin to a dynamic heat treatment in the presence of a cross linking agent.

3. An olefinic thermoplastic elastomer, obtained by subjecting a rubber composition comprising
   (A) 10–60%, based on the total weight of the composition, of a propylene resin having a melt flow rate (according to ASTM D 1238-65T, determined at 230° C. under a load of 2.16 kg) in the range from 0.1 to 3 g/10 min.,
   (B) 37–87%, based on the total weight of the composition, of an ethylenic copolymer rubber made from ethylene, an α-olefin having 3–20 carbon atoms and an optionally incorporated non-conjugated polyene and
   (C) 3–30%, based on the total weight of the composition, of a polyethylene resin to a dynamic heat treatment in the presence of a cross linking agent, wherein the said elastomer has a characteristic feature that it satisfies, when a grained sheet made of the said elatomer is subjected to a male vacuum forming at least at a point of sheet temperature within the range of 130–150° C., the condition that the grain retention rate expressed by the proportion of the grain depth of the sheet retained after the male vacuum forming relative to the grain depth before the male vacuum forming represented by percent meets the relation defind by the following equation (1)

$$\% \text{ retention of grain} \geq 100-2.0\times(T-120) \quad (1)$$

in which T represents the sheet temperature upon the male vacuum forming.

4. The olefinic thermoplastic elastomer as claimed in claim 2 or 3, wherein the polyethylene resin (C) has a density in the range from 0.880 to 0.940 g/cm³.

5. The olefinic thermoplastic elastomer as claimed in claim 2, comprising further a softener (D) in a proportion in the range from 10 to 200 parts by weight per 100 parts by weight of the ethylenic copolymer resin (B).

6. The olefinic thermoplastic elastomer as claimed in claim 1, wherein the gel content thereof is in the range from above 20 to below 97%, based on the weight of the olefinic thermoplastic elasomer.

7. The olefinic thermoplastic elastomer as claimed in claim 1, to be used as the material of coverage skin sheets for interior furnishings of automobile.

8. An olefinic thermoplastic elastomeric composition, comprising the olefinic thermoplastic elastomer as claimed in claim 1 and a crystalline polyolefin resin (E), wherein the proportion of the crystalline polyolefin resin (E) is in the range from 20 to 200 parts by weight per 100 parts by weight of the olefinic thermoplastic elastomer.

9. The olefinic thermoplastic elastomeric composition as claimed in claim 8, to be used as the material of coverage skin sheets for interior furnishings of automobile.

10. A sheet made of the olefinic thermoplastic elastomer as claimed in claim 1 or of the olefinic thermoplastic elastomeric composition as claimed in claim 8.

11. A grained sheet made of the olefinic thermoplastic elastomer as claimed in claim 1 or of the olefinic thermoplastic elastomeric composition as claimed in claim 8.

12. An olefinic thermoplastic elastomer comprising:
   (A) a propylene resin having a melt flow rate according to ASTM D 1238-65T determined at 230° C. under a load of 2.16 kg in the range of 0.1 to 3 g/10 min.,
   (B) an ethylenic copolymer rubber made from ethylene, an α-olefin having 3–20 carbon atoms and an optionally incorporated non-conjugated polyene, and
   (C) a polyethylene resin, wherein when a grained sheet made of said elastomer is subjected to a male vacuum forming at least at a point of sheet temperature within the range of 130–150° C., using a testing metal mold as shown in FIG. 1(a) and FIG. 1(b), which metal mold has a ridge 3 protruding from the flat mold face 2 in the dimension that $w_1$ and $w_5$ are both 5 cm, $w_2$ and $w_4$ are both 2.5 cm, $W_3$ is 15 cm and $h_1$ is 3 cm, the grain retention rate of said sheet made of said elastomer, as expressed by the proportion of the grain depth of the sheet retained after being subjected to the male vacuum forming relative to the grain depth before being subjected to the male vacuum forming, meets the relation defined by the following inequality (1)

$$\% \text{ retention of grain} \geq 100-2.0\times(T-120) \quad (1)$$

in which T represents the surface temperature (°C.) of said grained sheet, wherein said male vacuum forming is performed at the temperature T of said grained sheet within the range from 130° C. to 150° C.

13. An olefinic thermoplastic elastomer, obtained by subjecting a rubber composition comprising:
   (A) a propylene resin having a melt flow rate according to ASTM D 1238-65T determined at 230° C. under a load of 2.16 kg in the range of 0.1 to 3 g/10 min.,
   (B) an ethylenic copolymer rubber made from ethylene, an α-olefin having 3–20 carbon atoms and an optionally incorporated non-conjugated polyene, and
   (C) a polyethylene resin, to a dynamic heat treatment in the presence of a crosslinking agent, wherein when a grained sheet made of said elastomer is subjected to a male vacuum forming using a testing metal mold as shown in FIG. 1(a) and FIG. 1(b), which metal mold has a ridge 3 protruding from the flat mold face 2, wherein $w_1$ and $w_5$ are both 5 cm, $w_2$ and $w_4$ are both 2.5 cm, $w_3$ is 15 cm and $h_1$ is 3 cm, the grain retention rate of said sheet made of said elastomer, as expressed by the proportion of the grain depth of the sheet retained after being subjected to the male vacuum forming relative to the grain depth before being subjected to the male vacuum forming, meets the relation defined by the following inequality (1)

$$\% \text{ retention of grain} \geq 100-2.0\times(T-120) \quad (1)$$

in which T represents the surface temperature (°C.) of said grained sheet, wherein said male vacuum forming is performed at the temperature T of said grained sheet within the range from 130° C. to 150° C.

* * * * *